Jan. 12, 1943.   C. F. MULLENBACH   2,308,199
VARIABLE RESISTOR FOR ARC WELDER FIELDS
Filed Jan. 6, 1942   2 Sheets-Sheet 1
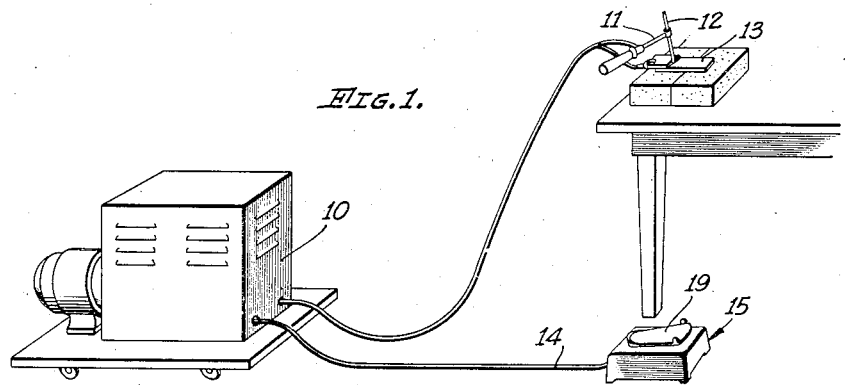
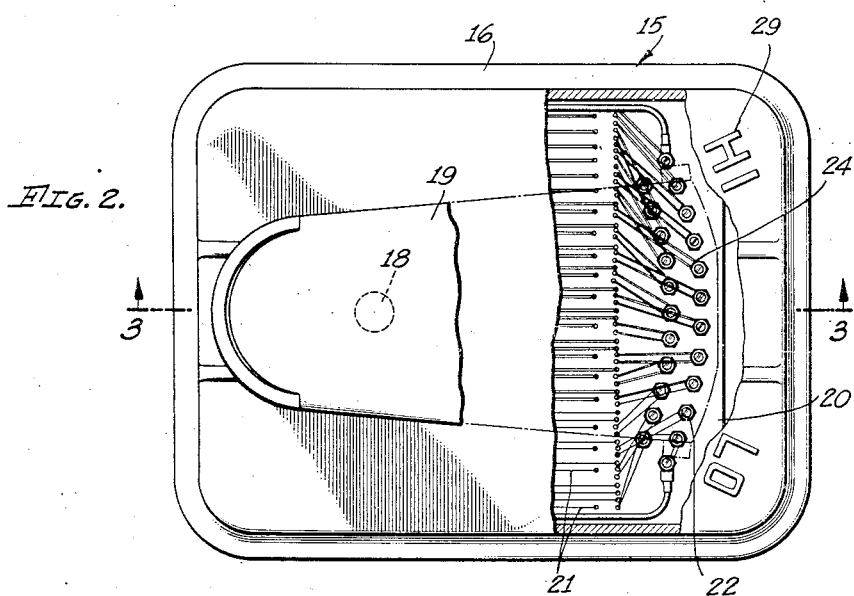
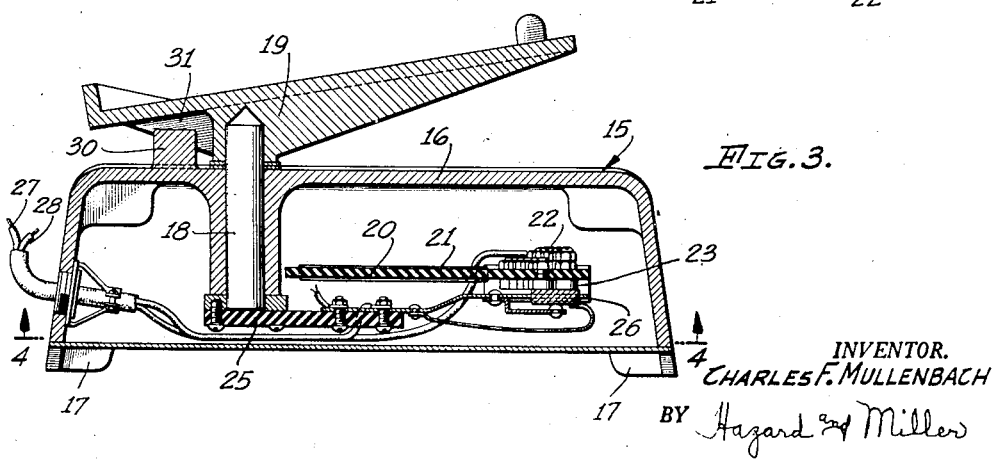
INVENTOR.
CHARLES F. MULLENBACH
BY Hazard and Miller
ATTORNEYS.

Jan. 12, 1943.  C. F. MULLENBACH  2,308,199
VARIABLE RESISTOR FOR ARC WELDER FIELDS
Filed Jan. 6, 1942  2 Sheets-Sheet 2

INVENTOR.
CHARLES F. MULLENBACH
BY Hazard & Miller
ATTORNEYS.

Patented Jan. 12, 1943

2,308,199

UNITED STATES PATENT OFFICE 2,308,199

VARIABLE RESISTOR FOR ARC WELDER FIELDS

Charles F. Mullenbach, Los Angeles, Calif., assignor to Mullenbach Electrical Manufacturing Company, Los Angeles, Calif., a partnership composed of Robert J. Mullenbach, Paul L. Mullenbach, Charles F. Mullenbach, and Anna F. Mullenbach Application January 6, 1942, Serial No. 425,759

2 Claims. (Cl. 201—48)

This invention relates to a variable resistor for arc welder fields.

The conventional arc welding apparatus includes a power driven, direct current generator from which conductors lead to an electrode holder and to the work that is to be welded. Ordinarily, the field winding of the generator includes a variable resistance whereby the field current can be controlled to vary the output current supplied to the electrode and the work. Such variable resistance is normally controlled by a suitable handle mounted on the generator itself. In arc welding however it is frequently desirable to vary the output current supplied by the generator while the welding is in progress. For example, in welding mitered joints of pipe usually less current is supplied in welding around the convex side of the joint than when welding around the concave side of the joint. In certain types of work it is desirable to cause more current to be supplied than in other types. Also, when welding, it is desirable to cut down the amount of current supplied by the generator at the end of the bead so as to effectively snuff out the arc. Ordinarily, if the arc is broken at the end of the bead a small crater is formed in the weld tending to weaken the weld at this point which of course is objectionable. When the arc is snuffed out by cutting down the field current of the generator, such objectionable crater is avoided. When the resistance in the field winding is controlled by a handle on the generator it is difficult, if at all possible, to vary the current during the process of welding as the welder ordinarily under these circumstances must break the arc, lay his electrode holder on a suitable support, and leave the work to adjust the handle on the generator.

Heretofore attempts have been made to automatically control the amount of output current supplied by the generator or to vary the field winding resistance by manipulating a part of the electrode holder. The automatic constructions do not enable the increase or decrease of current supplied to the weld when desired and the objection to manipulating a part of the electrode holder is that it is difficult to hold the electrode steady and continue with the welding while the field resistance is being adjusted.

An object of the present invention is to provide a variable resistor for arc welder fields which is operable by the foot of the welder so that the welder can increase or decrease the output current from the generator as desired during the process of welding without breaking the arc or stopping the welding operation. In this way, the amount of current supplied is under the absolute control of the welder at all times.

With the foregoing and other objects in view, which will be made manifest in the following detailed description and specifically pointed out in the appended claims, reference is had to the accompanying drawings for an illustrative embodiment of the invention, wherein:

Figure 1 is a perspective view illustrating an arc welding apparatus illustrating the invention as having been incorporated therein or applied thereto;

Fig. 2 is a top plan view of the resistor embodying the present invention, parts being broken away to illustrate the upper side of the resistance winding;

Fig. 3 is a sectional view taken substantially upon the line 3—3 upon Fig. 2 in the direction indicated;

Figure 4:
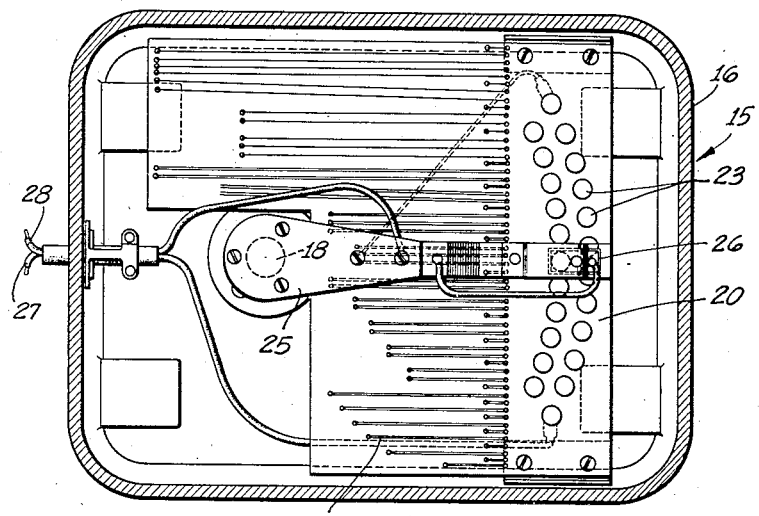
Fig. 4 is a horizontal section taken substantially upon the line 4—4 upon Fig. 3 in the direction indicated.

Referring to the accompanying drawings wherein similar reference characters designate similar parts throughout, in Fig. 1 there is illustrated an arc welding generator 10 suitably power driven which supplies its output current to an electrode holder 11 carrying an electrode 12 and the work 13. The field winding of the generator is connected by electrical conductors within a cord 14 to a variable resistor 15. The length of the cord 14 is normally approximately equal to the length of the conductors leading from the generator to the electrode holder so that the variable resistor 15 can be positioned in the neighborhood of the location of the work 13 that is to be welded.

The resistor illustrated in Figs. 2 to 4, inclusive, comprises a suitable housing 16 having legs 17 at its corners by which it is supported. This housing has a rock shaft 18 extended vertically through its top and on this rock shaft there is positioned a pedal 19 adapted to receive the foot of the welder. Within the housing there is disposed a section of insulating material 20 on which resistance wire 21 is wound. In the preferred form of construction the sheet or section of insulating material is perforated transversely to receive the convolutions of the wound resistance wire 21. Adjacent one end of the section 20 there are binding posts 22 which extend through the sheet 20 and provide on its under side arcuate rows of contacts 23. The windings of resistance wire about the sheet 20 through the perforations therein are at regular intervals extended as indicated at 24 around the binding posts so that the contacts tap the resistance winding at various points.

On the bottom of the rock shaft 18 there is secured an insulating arm 25 which in turn carries a spring actuated brush 26 arranged to wipe across the contacts 23. The conductors 27 and 28 within the cord 14 come from and lead back to the field winding of the generator. One of these conductors leads to the brush 26 while the other conductor leads to the endmost contact 23. On the top of the housing there may be formed suitable indicia 29 indicating the extreme positions of the pedal 19 when all of the resistance is either cut in or out in the generator field circuit.

In the preferred form of construction a suitable stop lug 30 is also formed on the top of the housing engageable by portions 31 on the under side of the pedal to limit rotational movement of the pedal.

The operation and advantages of this form of construction are as follows: In welding the work 13 the welder may position one foot on the pedal 19 and proceed continuously with the welding giving his undivided attention thereto. If, in the course of the welding, it is desirable to increase or decrease the amount of output current from the generator the welder accomplishes this by merely turning the pedal 19 to the right or to the left as the case may be, to cut in or cut out resistance in the field. In this way the welder may carefully maintain his arc at all times, varying the amount of current supplied thereto as circumstances may require. At the end of the weld if he desires to avoid the objectionable crater occasioned by breaking the arm the welder may cut in all of the available resistance afforded by the resistance wire 21 thus cutting down the amount of current supplied to the electrode and in effect snuffing out the arc as distinguished from breaking it.

Ordinarily the resistor being small and readily portable can be readily carried to a location sufficiently close to the work to enable the welder to operate the same by his foot while proceeding with the welding operation.

Figure 5:
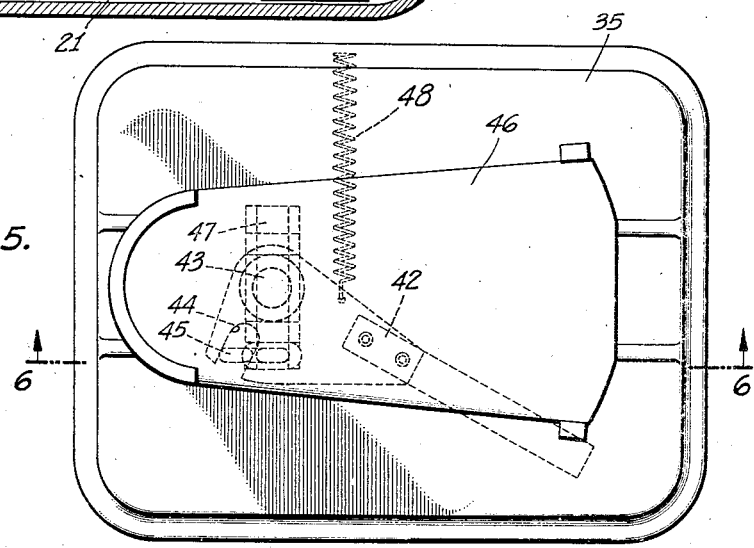
Fig. 5 is a top plan view of an alternative form of variable resistor that may be employed.
Figure 6:
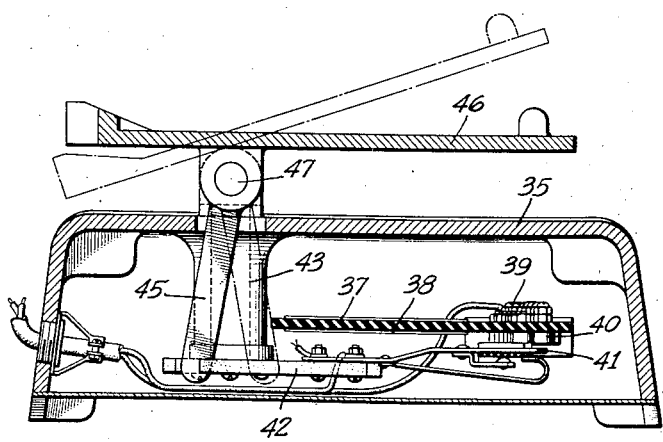
Fig. 6 is a sectional view taken substantially upon the line 6—6 upon Fig. 5.

In Figs. 5 and 6, a slightly modified form of construction is disclosed. Therein, the resistor comprises a suitable housing 35 having legs 36 within which housing there is a sheet or section of insulating material 37 on which the resistance wire 38 is wound. The binding posts are indicated at 39 having contacts 40 adapted to be traversed by the brush 41. The brush which is mounted on the insulating arm 42 rotates on the bottom of the vertical shaft 43 as a center. The arm however has a slot or recess 44 cut therein through which extends an arm 45 extending downwardly from the pedal 46. The pedal 46 rotates on a horizontal shaft or pintle 47.

In this form of construction the operation and advantages of the variable resistor are the same as those previously explained. However, in this form of construction instead of moving the pedal in a lateral direction or from right to left the pedal moves about a horizontal axis as indicated by the dotted and full-line positions shown in Fig. 6. Depressing the toe of the pedal causes the arm 42 to swing into the dotted line position illustrated in Fig. 5, and by relieving the pressure on the toe of the pedal the arm 42 may be swung toward the opposite side of the resistance by means of a coil tension spring 48.

From the above described construction it will be appreciated that the improved variable resistor is highly advantageous in that it enables the welder to control the amount of current supplied to the arm at all times. This may be varied by the welder during the course of the welding operation in accordance with his desires or as circumstances may require. By having the control located in the neighborhood of the weld it is unnecessary for the welder to discontinue the welding operation while making an adjustment of the field resistance on the generator itself. Nor is it necessary for him to manipulate the electrode holder other than that necessarily involved in the course of welding. In other words, control of the resistance while it is accomplished by the welder in the course of his welding he is nevertheless independent of the welding apparatus or electrode holder itself.

Various changes may be made in the details of construction without departing from the spirit or scope of the invention as defined by the appended claims.

I claim:

1. In combination with the generator of arc welding equipment, a variable resistance controlling the field of the generator remote from the generator and operable by the foot of the welder.

2. In combination with the generator of arc welding equipment, a variable resistance connected to and controlling the field of the generator so as to vary the field current, and means operable by a limb of the welder independently of his hands that may be holding an electrode holder for adjusting the resistance.

CHARLES F. MULLENBACH.